May 19, 1959 H. M. OGLE 2,887,644

FREQUENCY MULTIPLIER CIRCUIT

Filed Dec. 23, 1955 3 Sheets-Sheet 1

Inventor:
Hugh M. Ogle,
by Merton D. Moore
His Attorney.

May 19, 1959 H. M. OGLE 2,887,644

FREQUENCY MULTIPLIER CIRCUIT

Filed Dec. 23, 1955 3 Sheets-Sheet 2

Inventor:
Hugh M. Ogle,
by Merton D. Moore
His Attorney.

May 19, 1959

H. M. OGLE 2,887,644

FREQUENCY MULTIPLIER CIRCUIT

Filed Dec. 23, 1955

3 Sheets-Sheet 3

Inventor:
Hugh M. Ogle,
by Merton D. Moore
His Attorney.

United States Patent Office 2,887,644

Patented May 19, 1959

2,887,644

FREQUENCY MULTIPLIER CIRCUIT

Hugh M. Ogle, Schenectady, N.Y., assignor to General Electric Company, a corporation of New York Application December 23, 1955, Serial No. 555,086

15 Claims. (Cl. 321—69)

This invention relates to an electric frequency multiplication system which does not utilize rotating or moving elements. More particularly, this invention relates to static frequency multiplication apparatus which utilizes saturable core impedance devices.

There are many industrial applications, such as industrial control systems and industrial heating, where it would be useful to be able to obtain high frequencies from a source of standard power frequency, e.g., 60 cycles, utilizing a static frequency multiplier. The usefulness of such a frequency multiplier having a wide range of multiples, i.e., a wide frequency multiplication range, would be even greater. For example, such a multiplier could be utilized to vary the speed of alternating current motors of the induction type over a wide range, thus extending the range of usefulness of such motors considerably.

Many forms of static frequency multipliers have been proposed or used in the past. However, the maximum frequency multiplication which can be obtained in a single stage utilizing available static multipliers is generally two or three. These methods additionally have the disadvantage of incurring excessive core losses where a power input frequency of the order of 60 cycles or greater is used. These disadvantages, in a large part, offset the advantages of static frequency multipliers.

Accordingly, it is an object of this invention to provide static frequency multiplier circuits wherein the power input frequency may be multiplied by any positive integer in a single stage.

In accordance with the illustrated embodiment of this invention, the frequency multiplier consists of a ladder network having input terminals between the uprights or sidepieces to receive an input voltage. The ladder rungs consist of capacitors, one ladder sidepiece contains saturable reactors between each rung, and the opposite side piece consists of a return lead. The load may be connected in the return lead between one input terminal and the first capacitor, or it may be inductively coupled to circuit through the cores of the saturable reactors. Where the load is connected between one input terminal and the first capacitor, a filter circuit is preferably used with the multiplier in order to eliminate the fundamental component in the output circuit. The multiplying capacity of the circuit is dependent upon the number of ladder sections.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which Fig. 1 is a diagrammatic representation of a frequency multiplier circuit embodying this invention;

Figure 5A:
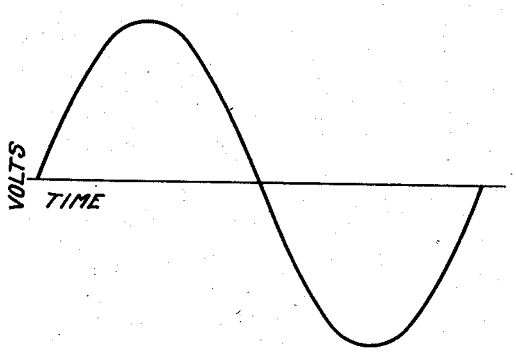
Figure 5B:
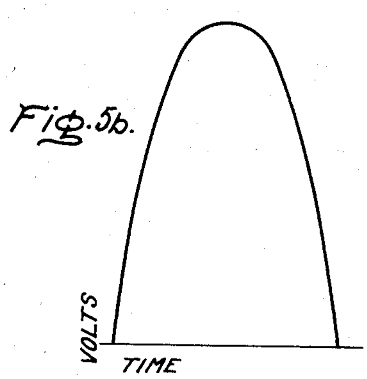
Figure 6:
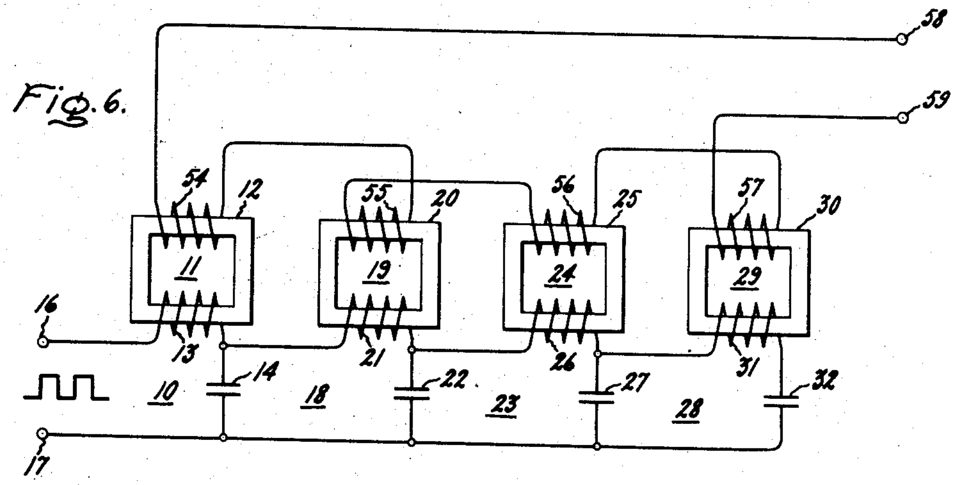

Figs. 5*a* and 5*b* illustrate two sine waves which may be applied to the circuit of Fig. 1, and Figs. 5*c* through 5*e*, inclusive, illustrate the resultant voltage wave forms;

Fig. 6 is a circuit diagram of another frequency multiplier embodying the present invention, and Figs. 7*a* through 9*b*, inclusive, illustrate voltage wave forms which may be applied to the frequency multiplier circuit of Fig. 6 and the resultant wave forms which appear across the load.

Referring specifically to the circuit illustrated in Fig. 1, the frequency of the voltage wave impressed between the input terminals 16 and 17 of the circuit is multiplied by the requisite factor by the ladder network and applied across a load device 15 in the manner described in detail hereinafter. The first section 10 of the ladder network which makes up the frequency multiplier consists of a saturable core impedance device 11, a capacitor 14, and an electrical load device 15, all connected in series with each other between input terminals 16 and 17. The saturable core impedance device 11 illustrated is a common saturable reactor having a saturable core 12 and a main or reactance winding 13 wound thereon. An alternating current power supply of the basic frequency which is to be multiplied is connected between the input terminals 16 and 17.

For most applications the voltage impressed between the input terminals 16 and 17 is a square wave, which may be obtained by utilizing a sine wave power supply and a conventional clipping circuit. If, however, the output wave shape is not important, as for example for industrial heating purposes, a sine wave input may be used instead of the square wave.

Each succeeding section of the ladder network is made up of a series circuit, which circuit also includes a saturable core impedance device and a capacitor, and each such succeeding circuit is connected across the capacitor of the preceding section. The power input frequency is multiplied by twice the number of sections in the ladder network and, therefore, the number of sections utilized is dependent upon the frequency of the available power source and the desired output frequency (the frequency across the load device 15). For example, the network illustrated in Fig. 1 has four full sections which multiply the basic input frequency by eight and a phantom section representing an additional number of sections N.

The second ladder section 18 has a saturable reactor 19 having a saturable core 20 and a main or reactor winding 21, and a capacitor 22 connected in series with the main winding 21. This series circuit is connected across the capacitor 14 of the first ladder section. If the ladder network were made up only of the elements described thus far (two sections), the frequency appearing across the load device 15 would be four times the power input frequency.

The third ladder section 23 is provided with a saturable core impedance device 24 having a saturable core 25 and a main winding 26 connected in series with a capacitor 27 across the capacitor 22 of the second ladder section 18. The fourth ladder section 28 is also provided with a saturable core impedance device 29 which corresponds to the saturable core impedance devices 11, 19, and 24 of the preceding ladder sections and a capacitor 32 which corresponds to the capacitors 14, 22, and 27 in the preceding ladder rungs. That is to say, the saturable core impedance device 29 is also provided with a saturable core 30 and a main or reactance winding 31 wound thereon and the main or reactance winding 31 is connected in series with capacitor 32. Again, the series combination is connected across the capacitor 27 of the preceding (third) ladder section 23. The four sections described thus far will multiply the input power frequency by eight. Thus, the voltage appearing across load 15 will have a frequency of eight times that of the power input frequency.

The succeeding section N is shown in broken lines to indicate that any number of sections might be added in order to obtain a freqency multiplier circuit having a basic multiplication factor of 2*n* (where *n* is the total number of sections). The final section N is shown as having a saturable core impedance device 33 which corresponds to the saturable core impedance devices in the preceding sections of the ladder network and which, accordingly, has a saturable core 34 and a main or reactor winding 35 wound thereon. This section N of the ladder network is also provided with a capacitor 36 connected in series with the main or reactor winding 35 across the capacitor 32 of the fourth ladder section 28.

Operation of the frequency multiplier may be analyzed by assuming that a square wave of alternating potential, such as the one illustrated in Fig. 3*a*, is applied between the power input terminals 16 and 17 of the ladder network. Due to the initial unsaturated state of the core 12 of the first saturable core impedance device 11, the impedance of the main reactor winding 13 is high. Therefore, most of the applied voltage will appear across the main reactor winding 13 for a brief period of time. This time will be determined by the core constants, such as the permeability and physical dimensions thereof, the number of turns on the core, and the applied voltage. The core 12 will then saturate and cause a surge of current to flow, and the capacitor 14 in the first rung will charge up to line voltage. During this period, the saturable reactor 19 of the second stage effectively holds off the line voltage from the capacitor 22 in the second ladder section for a brief period since most of the line voltage will then appear across its main winding 21 until the core 20 saturates. When the core 20 saturates, a second pulse of current will flow while the capacitor 22 in the second rung of the ladder network is charged.

This operation is then repeated with respect to the third ladder section 23, the fourth ladder section 28, and the N ladder sections which follow until all of the saturable cores have been saturated. If ten cores are used, this will result in ten current pulses for one-half cycle of the supply voltage producing a frequency twenty times that of the supply. If *n* cores are used (*n* number of ladder sections), this will result in *n* current pulses for one-half cycle of the supply voltage.

When the supply voltage reverses, the process just described repeats. All of the cores in turn go from negative saturation to positive saturation or vice versa and permit *n* number of pulses of current to flow. Thus, it will be seen that the saturable reactors (11, 13, 14, 29, and 33) effectively act as switches which are closed at successive intervals after the initiation of the power input voltage.

The output wave just described is illustrated in Fig. 3*b* if the applied voltage is of the configuration illustrated in Fig. 3*a*. Fig. 3*b* illustrates the output wave where four ladder sections are utilized and shows that the first negative half-cycle of the applied voltage results in four negative pulses being applied to the load. In a like manner, the first positive half-cycle of the applied voltage causes four positive pulses of current to flow. Fig. 3*b* also shows that there will be a component of fundamental frequency in the wave shape unless some filtering means is provided for the circuit of Fig. 1.

As has been previously indicated, the time for saturating each of the cores in the circuit is dependent upon a number of factors such as the applied voltage, the size of core, and the core material. When a square wave voltage of the magnitude illustrated in Fig. 3*a* is applied to the circuit but the core material, or core size, is changed to give cores which will saturate in half the time required for the saturation of the cores which were utilized to give the wave shape illustrated in Fig. 3*b*, the current surges or pulses will occur faster (one-half the time). Fig. 3*c* illustrates a wave form which results from utilizing such cores in the frequency multiplier circuit. That is to say, that the output wave illustrated in Fig. 3*c* results from the use of cores having a volt-time integral for saturation of a magnitude which is one-half that of the cores which gave the wave shape illustrated in Fig. 3*b*. Thus, it is seen from Fig. 3*c* that the four negative pulses which result from the application of the first negative square wave pulse to the circuit are of the same amplitude as those illustrated in Fig. 3*b* but occur in the half of the first negative half-cycle of the applied square wave. No further pulses occur until the application of a positive half-cycle, at which time four positive pulses occur in the first half of the positive half-cycle. This process repeats itself for each applied half-cycle, as is illustrated in Fig. 3*c*, with the output pulses occurring in the first half of each applied half-cycle of voltage.

Since the volt-time integral required for the saturation of a core may be changed by varying a dimension of each of the cores or by the application of a bias to the cores, the method just discussed presents a simple way of changing the frequency of occurrence of the pulses without actually changing the number of saturable reactors in the circuit. Means of varying core dimensions and core bias are well known in the art and, therefore, it is felt that a discussion of these methods is not warranted here. However, the obvious way to bias a core is to put a separate biasing winding on each core and supply a biasing voltage thereto.

Another method of varying the time required for each ladder section to give an output pulse is to vary the magnitude of the applied voltage. This condition is illustrated in Fig. 4. The square waves illustrated in Figs. 3*a* and 4*a* are of the same frequency but the amplitude of the wave shown in Fig. 4*a* is twice that of the wave of Fig. 3*a*. If the volt-time integral required for saturating the individual cores is not changed, then doubling the voltage should halve the time required for the pulses to occur, and the amplitude of the resultant pulses should be of increased magnitude. Fig. 4*b* illustrates the output wave which results from the application of the wave of Fig. 4*a* to the circuit of Fig. 1. The output pulses which result from the application of the doubled voltage wave have twice the amplitude but occur in the same period of time as the pulses illustrated by the wave shape of Fig. 3*c*.

From the above discussion, it is apparent that the length of each series of individual output pulses is an inverse function of the magnitude applied voltage. This, of course, is as expected since the volt-time integral required for the saturation of each core is determinative of the point of time in each half-cycle of applied voltage for a current pulse to flow. Such bursts of pulses of alternating current which contain the same number of pulses or cycles and occupy different periods of time actually constitute a variable frequency output. Thus, the output frequency may be controlled by varying or controlling the magnitude of the applied voltage, by varying core conditions, or by varying or controlling the initial saturation of the core in the ladder sections, as well as by varying the number of ladder sections to change the basic circuit multiplying factor.

Figure 3:
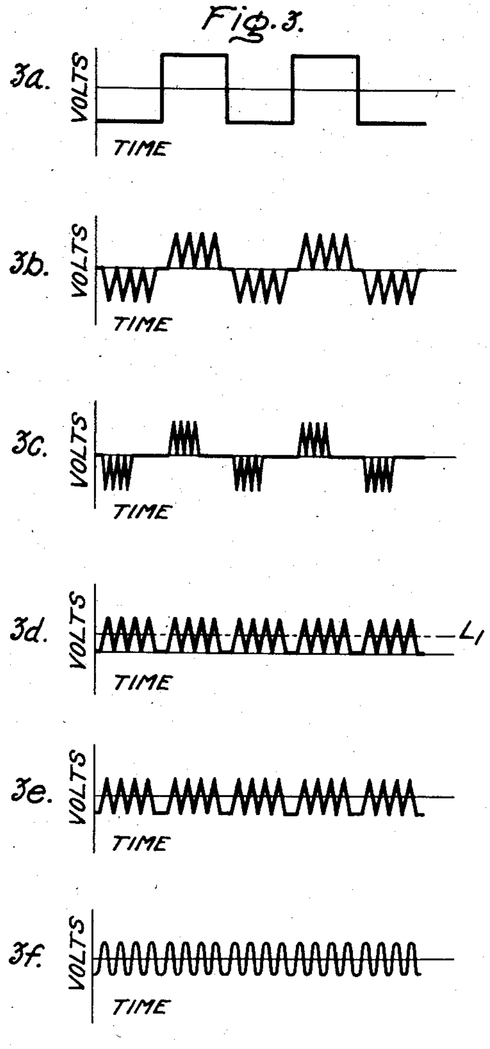
Figs. 3 and 4 illustrate voltage wave forms which may be applied to the frequency multiplier circuits illustrated and the resultant voltage wave forms which appear across the load.
Figure 4:
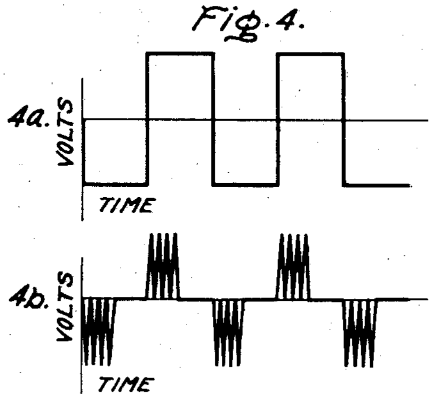

As has been seen from the wave shapes of Figs. 3 and 4, the alternating output voltage pulses cycle first about a negative value and next about a positive value when the first half-cycle of applied square wave voltage is negative and the second half-cycle is positive.

Figure 1:
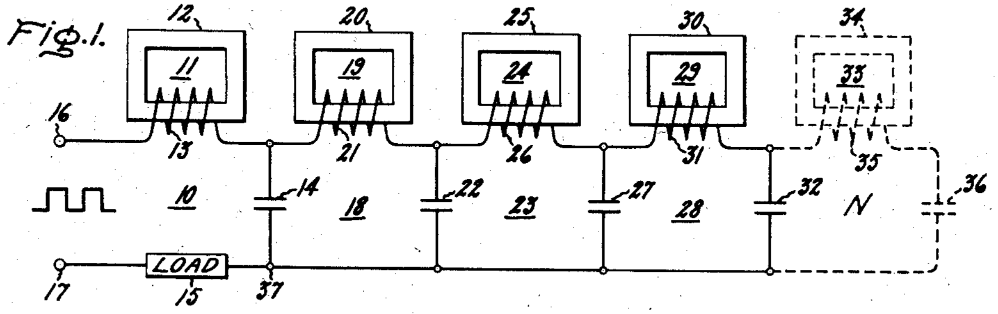
Figure 2:
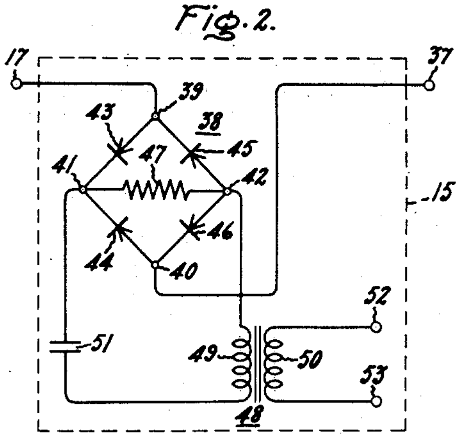
Fig. 2 is an elementary circuit diagram showing a rectifying and filtering arrangement which may be used with the frequency multiplier of Fig. 1.

In order to have the voltages from both the positive and negative half-cycle of applied voltage cycle about a given axis, the circuit may be modified as illustrated in Fig. 2. In Fig. 2, the broken line box is intended to be substituted for the load 15 in the circuit of Fig. 1.

In order to have the output pulses cycle about a single axis for each half-cycle of the input voltage, a full wave bridge rectifier 38 is provided. The full wave bridge rectifier is a conventional one having input terminals 39 and 40 and output terminals 41 and 42 with rectifiers 43, 44, 45, and 46 connected between these terminals in a bridge arrangement. The input terminals 39 and 40 of the bridge are intended to be connected between the input terminal 17 and terminal 37 of the first ladder section 10. In order to develop the output voltage which appears between the output terminals 41 and 42 of the full wave bridge arrangement, a load coupling impedance or load resistor 47 is connected therebetween.

It is, of course, realized that although the output voltage pulses will be made to cycle about a single axis for both the positive and negative applied voltage cycles, the voltage appearing across the load resistor 47 will still have a direct current component as is illustrated in Fig. 3*d*. As a consequence, a filtering or isolating circuit is utilized which, in the embodiment illustrated, consists of a transformer 48 having a primary winding 49 and a secondary winding 50, and a filtering capacitor 51 connected in series with the primary winding 49 of the isolating transformer. The output of the isolating transformer 48 is connected to supply a pair of output terminals 52 and 53 and a load connected thereto but not shown.

In order to understand the operation of the circuit illustrated in Fig. 2, it must be understood that the circuit of Fig. 1 connected operates in exactly the same manner whether the circuit of Fig. 2 or of some other load is connected between the terminals 17 and 37. Thus, for a square wave (as illustrated in Fig. 3*a*) applied between the input terminals 16 and 17 of the input section, the series of current pulses will be produced in the frequency multiplier circuit, as previously described. Pulses such as those illustrated in Fig. 3*b* appear across the load 15 and, consequently, between the input terminals 39 and 40 of the full wave bridge circuit 38. As was previously indicated, this impressed voltage will have a direct current component unless filtering means is provided. The bridge rectifier 38 will cause both the negative and positive pulses appearing across the load resistor 47 to occur above the zero axis as illustrated in Fig. 3*d*. Due to the direct current component, the alternating pulses cycle about the axis illustrated indicated by the broken line L1.

If further improvement in this wave shape is desired, the filter circuit previously described is connected across the output terminals 41 and 42 of the full wave bridge rectifier 38 and thus across the load resistor 47. The wave shape of the output voltage appearing between the output terminals 52 and 53 of the isolating transformer is illustrated in Fig. 3*e*. It will be noted that the direct current component which appears in the wave shape of Fig. 3*d* is eliminated and the pulses cycle about the zero axis. If this circuit is loaded by a proper load impedance connected between the output terminals 52 and 53, the output voltage wave shape may be substantially improved and have the appearance of the wave illustrated in Fig. 3*f*.

Figure 5C:
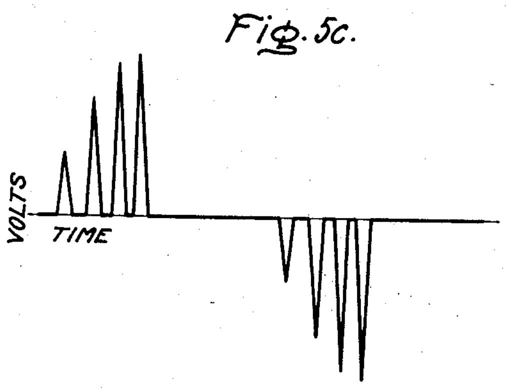
Figure 5D:
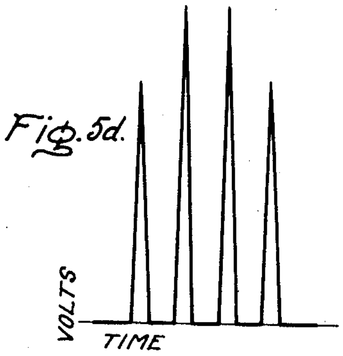
Figure 5E:
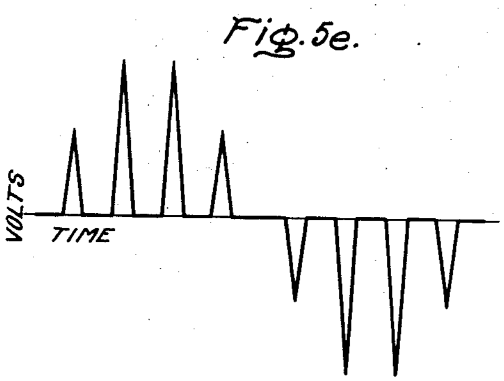

Since use of the frequency multiplier is contemplated for such applications as industrial heating where a sinusoidal wave may be applied to the input terminals of the frequency multiplier, the output wave shapes for an applied sinusoidal wave are illustrated in Figs. 5*a* through 5*e*, inclusive. When the sinusoidal wave shape illustrated in Fig. 5*a* is applied between the input terminals 16 and 17 of the circuit of Fig. 1 (having four ladder sections), the wave form across the load will consist of a series of pulses which may be fitted in an envelope of a sinusoidal wave having the same frequency as the applied voltage. That is to say, that each succeeding pulse will vary in magnitude in such a manner that their envelope is sinusoidal and of the same frequency as the applied voltage. For the general condition, each succeeding output pulse for a given half-cycle of applied voltage will occur closer to the preceding pulse because the voltage of a sine wave increases so rapidly for the first quarter of a cycle and thus the time element of the volt-time integral required to saturate the individual cores will be reduced. In other words, the pulses for each half-cycle will bunch up near the front of the applied half-cycle. This condition is illustrated in Fig. 5*c*. The number of pulses occurring in the output wave, of course, is still dependent upon the number of ladder sections as has previously been described. In order to spread the output pulses more evenly over the applied half-cycle, the number of turns of the main windings 13, 21, 26, and 31 of the saturable core reactors 11, 19, 24, and 29 can be adjusted. This is essentially a matter of adjusting the volt-time integral required for saturating the cores of the ladder sections. The output wave shape for such an adjusted circuit is illustrated in Fig. 5*e*.

If the magnitude of the applied sinusoidal voltage is doubled and the frequency is maintained the same, as illustrated in Fig. 5*b*, the first output pulse will occur earlier in the half-cycle. If the number of turns on the main windings 13, 21, 26, and 31 of the saturable core impedance devices 11, 19, 24, and 29, respectively, are properly selected, the pulses across the load will again be spread evenly (in time) over each half-cycle of the applied voltage. Thus, as illustrated in Fig. 5*d*, the pulses appearing across the load for one-half cycle of the applied voltage will still fit into an envelope which is of the same frequency as the applied voltage and will be greater in magnitude than the pulses appearing across the load for any sinusoidal voltage which is smaller in magnitude than that which is applied.

Another way in which the direct current component of the output voltage may be eliminated is illustrated in the circuit of Fig. 6. The circuit of this figure represents a slight modification of the circuit of Fig. 1 and contains all of the components of that multiplier circuit. For simplicity, corresponding components in the two circuits are given the same reference numerals. The circuit of Fig. 6 differs from the circuit illustrated in Fig. 1 in that each saturable core reactor (reactors 11, 19, 24, and 29) is provided with an additional winding which may be referred to as a load output winding. These load output windings are numbered 54, 55, 56, and 57, respectively.

As illustrated, each successive load output winding is wound in the same sense with respect to its core so that each of the load output windings gives a positive output pulse for a positive pulse on its main reactor winding. Thus, for a series of positive pulses, each winding will give a positive pulse output; and for a series of negative pulses, each winding will have induced in it a negative pulse.

Figure 7A:
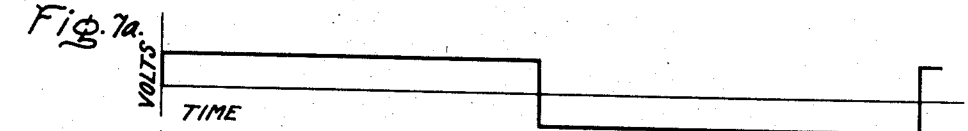
Figure 7B:
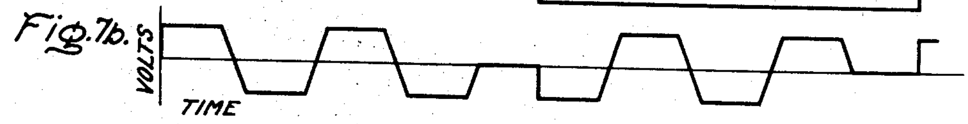

The load of the circuit of Fig. 6 is connected between output terminals 58 and 59 which are connected across the serially connected load output windings 54, 55, 56, and 57 on the respective saturable core reactors 11, 19, 24, and 29. It will be noted that although these windings are wound in the same manner on their respective cores, each succeeding winding is oppositely connected in the series circuit. Thus, for a series of positive pulses in the load output windings, the pulses which will appear between the output terminals 58 and 59 are alternately positive and negative. Consequently, if the square wave input voltage illustrated in Fig. 7*a* is applied between the input terminals 15 and 16 of the frequency multiplier of Fig. 6, a series of positive pulses will occur across each of the load output windings 54, 55, 56, and 57 for a positive half-cycle of applied voltage as described with respect to the circuit of Fig. 1, and a series of negative pulses as described with respect to that circuit will occur across these windings for a negative half-cycle of input voltage. However, the load for the frequency multiplier circuit, if connected between the output terminals 58 and 59, will receive four half-cycles which are alternately positive and negative (or vice versa) for each half-cycle of applied voltage due to the fact that the output windings 54, 55, 56, and 57 on the saturable reactors of the frequency multiplier network are oppositely connected. The resulting wave shape is illustrated in Fig. 7*b*.

Figure 8A:
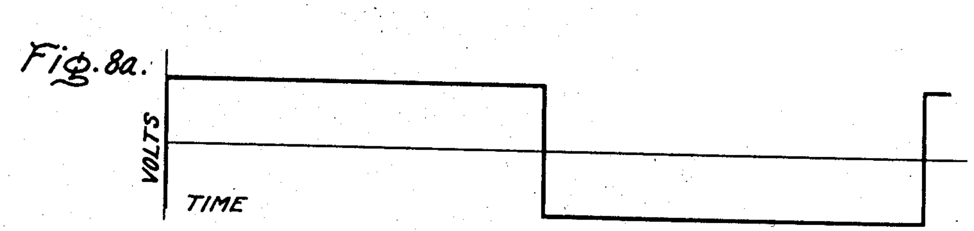
Figure 9B:
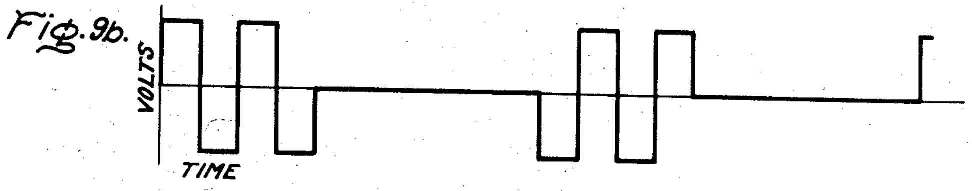

Figs. 8*a* and 8*b* are included to illustrate the result of applying the square wave voltage of Fig. 7*a* to the multiplier with its amplitude doubled and the number of cycles per unit of time remaining unchanged. The wave shape illustrated in Fig. 8*b* shows that the time required for each pulse will be reduced, as was described with respect to the circuit of Fig. 1 and the wave shapes illustrated in Figs. 4*a* and 4*b*. However, as will be seen from Fig. 9, the succeeding pulses are of opposite polarity across the load so that for each half-cycle of applied voltage there are two full cycles of voltage applied to the load.

From the foregoing discussion, it is seen that the applicant has accomplished the objects of this invention by providing an improved frequency multiplier circuit which may be utilized to vary the frequency of an output voltage in a number of different ways while utilizing an applied voltage having a constant frequency.

While particular embodiments of this invention have been shown, it will, of course, be understood that it is not limited thereto, since many modifications, both in the circuit arrangements, and in the instrumentalities employed, may be made. It is contemplated that the appended claims will cover any such modifications as fall within the true spirit and scope of this invention.

What I claim as new and desire to secure by Letters Patent of the United States is:

1. A frequency multiplier for supplying a load device with a voltage wave having a frequency which is a multiple of a power input frequency comprising an input section having a series circuit which consists of a saturable core impedance device and a capacitor connected between input terminals to receive an alternating current supply, at least one succeeding section consisting of a series circuit having a saturable core impedance device and a capacitor connected across the capacitor of the preceding section, whereby the saturable core impedance devices of each section are in turn saturated producing an electrical pulse upon saturation whereby the capacitor of each respective section is in turn electrically charged, and means for coupling a load to successively receive each of said pulses.

2. A frequency multiplier for supplying a load device with a voltage wave having a frequency which is a multiple of a power input frequency comprising an input section having a series circuit which consists of a saturable core impedance device and a capacitor connected between input terminals to receive an alternating current supply, means for coupling a load between one of said input terminals and one side of said capacitor and a plurality of succeeding sections each consisting of a series circuit having a saturable core impedance device and a capacitor connected across the capacitor of the preceding section.

3. A frequency multiplier for supplying a load device with a voltage wave having a frequency which is a multiple of $2n$ times a power input frequency comprising an input section having a series circuit which consists of a saturable core impedance device and a capacitor connected between two terminals to receive an alternating current supply, means for coupling a load between one of said terminals and one side of said capacitor, and $(n-1)$ succeeding sections each consisting of a series circuit having a saturable core impedance device and a capacitor connected across the capacitor of the preceding section.

4. A frequency multiplier for supplying a load device with a voltage wave having a frequency which is a multiple of a power input frequency comprising an input section having a series circuit which consists of a saturable core impedance device and a capacitor connected between power input terminals to receive an alternating current supply, a full wave bridge type rectifier having input and output terminals, said bridge input terminals being connected between one of said power input terminals and one side of said capacitor, and said bridge output terminals being connected to supply a load device, and at least one succeeding section consisting of a series circuit having a saturable core impedance device and a capacitor connected across the capacitor of the preceding section.

5. A frequency multiplier for supplying a load device with a voltage wave having a frequency which is a multiple of a power input frequency comprising an input section having a series circuit which consists of a saturable core impedance device and a capacitor connected between power input terminals to receive an alternating current supply, a full wave bridge type rectifier having input and output terminals, said bridge input terminals being connected between one of said power input terminals and one side of said capacitor, and said bridge output terminals being connected to supply the load device, and a plurality of succeeding sections each consisting of a series circuit having a saturable core impedance device and a capacitor connected across the capacitor of the preceding section.

6. A frequency multiplier for supplying a load device with a voltage wave having a frequency which is a multiple of $2n$ times a power input frequency comprising an input section having a series circuit which consists of a saturable core impedance device and a capacitor connected between two power input terminals to receive an alternating current supply, a full wave bridge type rectifier having input and output terminals, said bridge input terminals being connected between one of said input power terminals and one side of said capacitor, and said bridge output terminals being connected to supply a load device, and $(n-1)$ succeeding sections each consisting of a series circuit having a saturable core impedance device and a capacitor connected across the capacitor of the preceding section.

7. A frequency multiplier for supplying a load device with a voltage wave having a frequency which is a multiple of a power input frequency comprising an input section having a series circuit which consists of a saturable core impedance device and a capacitor connected between power input terminals to receive an alternating current supply, a full wave bridge rectifier circuit having input and output terminals, said input terminals being connected between one of said power input terminals and said capacitor, a load coupling impedance connected between the output terminals of said full wave bridge rectifier, an isolating transformer having its input terminals coupled across said load coupling impedance and its output terminals connected to supply the alternating current load device, and at least one succeeding section consisting of a series circuit having a saturable core impedance device and a capacitor, said series circuit being connected across the capacitor of the preceding section.

8. A frequency multiplier for supplying a load device with a voltage wave having a frequency which is a multiple of a power input frequency comprising an input section having a series circuit which consists of a saturable core impedance device and a capacitor connected between power input terminals to receive an alternating current supply, a full wave bridge rectifier circuit having input and output terminals, said input terminals being connected between one of said power input terminals and one side of said capacitor, a load coupling impedance connected between the output terminals of said full wave bridge rectifier, an isolating transformer coupled across said load coupling impedance to receive the voltage developed thereacross and having its output connected to supply the alternating current load device, and a plurality of succeeding sections each consisting of a series circuit having a saturable core impedance device and a capacitor, said series circuit being connected across the capacitor of the preceding section.

9. A frequency multiplier for supplying a load device with a voltage wave having a frequency which is a multiple of $2n$ times a power input frequency comprising an input section having a series circuit which consists of a saturable core impedance device and a capacitor connected between two terminals to receive an alternating current supply, a full wave bridge rectifier circuit having input and output terminals, said input terminals being connected between one of said power input terminals and one side of said capacitor, a load coupling impedance connected between the output terminals of said full wave bridge rectifier, an isolating transformer coupled across said load coupling impedance to receive the voltage developed thereacross and having its output terminals connected to supply the alternating current load device, and $(n-1)$ succeeding sections each consisting of a series circuit having a saturable core impedance device and a capacitor connected across the capacitor of the preceding section.

10. A frequency multiplier for supplying a load device with a voltage wave having a frequency which is a multiple of a power input frequency comprising an input section having a series circuit which consists of a saturable core impedance device and a capacitor connected between input terminals to receive an alternating current supply, at least one succeeding section consisting of a series circuit having a saturable core impedance device and a capacitor connected across the capacitor of the preceding section, a load winding for each of said multiplier sections inductively coupled to the main winding of each saturable core impedance device so that current pulses flowing through said main windings are induced in the associated load winding.

11. A frequency multipler for supplying a load device with a voltage wave having a frequency which is a multiple of a power input frequency comprising an input section having a series circuit which consists of a saturable core impedance device and a capacitor connected between input terminals to receive an alternating current supply, at least one succeeding section consisting of a series circuit having a saturable core impedance device and a capacitor connected across the capacitor of the preceding section, a load winding for each of said multiplier sections inductively coupled to the main winding of each saturable core impedance device so that current pulses flowing through said main windings are induced in the associated load winding, said load windings being connected in series with each other across a pair of load supply terminals, said load windings being connected in such a manner that pulses induced by successive saturable core impedance devices are of opposite polarity.

12. A frequency multiplier for supplying a load device with a voltage wave having a frequency which is a multiple of a power input frequency comprising an input section having a series circuit which consists of a saturable core impedance device and a capacitor connected between input terminals to receive an alternating current supply, a plurality of succeeding sections each consisting of a series circuit having a saturable core impedance device and a capacitor connected across the capacitor of the preceding section, a load winding for each of said multiplier sections inductively coupled to the main winding of each saturable core impedance device so that current pulses flowing through said main windings are induced in the associated load winding.

13. A frequency multiplier for supplying a load device with a voltage wave having a frequency which is a multiple of a power input frequency comprising an input section having a series circuit which consists of a saturable core impedance device and a capacitor connected between input terminals to receive an alternating current supply and a plurality of succeeding sections each consisting of a series circuit having a saturable core impedance device and a capacitor connected across the capacitor of the preceding section, a load winding for each of said sections inductively coupled to the main winding of each saturable core impedance device so that the current pulses flowing through said main windings induce similiar pulses in the associated load windings, said load windings being connected in series with each other across a pair of load supply terminals, said load windings being connected in such a manner that pulses induced by successive saturable core impedance devices are of opposite polarity.

14. A frequency multiplier for supplying a load device with a voltage wave having a frequency which is a multiple of $2n$ times a power input frequency comprising an input section having a series circuit which consists of a saturable core impedance device and a capacitor connected between two terminals to receive an alternating current supply and $(n-1)$ succeeding sections each consisting of a series circuit having a saturable core impedance device and a capacitor connected across the capacitor of the preceding section, a load winding for each of said multipler sections inductively coupled to the main winding of each saturable core impedance device so that current pulses flowing through said main windings are induced in the associated load winding.

15. A frequency muliplier for supplying a load device with a voltage wave having a frequency which is a multiple of $2n$ times a power input frequency comprising an input section having a series circuit which consists of a saturable core impedance device and a capacitor connected between two terminals to receive an alternating current supply and $(n-1)$ succeeding sections each consisting of a series circuit having a saturable core impedance device and a capacitor connected across the capacitor of the preceding section, a load winding for each of said sections inductively coupled to the main winding of each saturable core impedance device so that the current pulses flowing through said main windings induce similiar pulses in the associated load windings, said load windings being connected in series with each other across a pair of load supply terminals, said load windings being connected in such a manner that pulses induced by successive saturable core impedance devices are of opposite polarity.

References Cited in the file of this patent

UNITED STATES PATENTS 2,215,893 Walker et al. ---------- Sept. 24, 1940
2,727,159 Sunderlin ------------ Dec. 13, 1955